(12) United States Patent
Li et al.

(10) Patent No.: US 12,336,875 B2
(45) Date of Patent: Jun. 24, 2025

(54) ORAL CARING DEVICE

(71) Applicant: Shenzhen Soocas Technology Co., Ltd., Shenzhen (CN)

(72) Inventors: Junhui Li, Shenzhen (CN); Fandi Meng, Shenzhen (CN)

(73) Assignee: Shenzhen Soocas Technology, Co. LTD., Shenzhen (CN)

( * ) Notice: Subject to any disclaimer, the term of this patent is extended or adjusted under 35 U.S.C. 154(b) by 216 days.

(21) Appl. No.: 18/177,999

(22) Filed: Mar. 3, 2023

(65) Prior Publication Data
US 2023/0355366 A1  Nov. 9, 2023

(30) Foreign Application Priority Data

Aug. 5, 2022 (CN) .......................... 202210940250.8

(51) Int. Cl.
*A61C 17/36* (2006.01)
*A61C 17/20* (2006.01)
*A61C 17/22* (2006.01)

(52) U.S. Cl.
CPC .............. *A61C 17/36* (2013.01); *A61C 17/20* (2013.01); *A61C 17/222* (2013.01); *A61C 17/225* (2013.01); *A61C 2204/002* (2013.01)

(58) Field of Classification Search
CPC ....... A61C 17/36; A61C 17/20; A61C 17/222; A61C 17/225
See application file for complete search history.

(56) References Cited

U.S. PATENT DOCUMENTS

| | | | |
|---|---|---|---|
| 9,750,334 B2 * | 9/2017 | Kirchhofer | .............. A46B 9/04 |
| 2012/0096665 A1 * | 4/2012 | Ponzini | .................. A46B 7/042 |
| | | | 15/167.1 |
| 2014/0349246 A1 | 11/2014 | Johnson | |
| 2021/0307888 A1 * | 10/2021 | Wagner | .............. A61C 17/0202 |
| 2021/0330432 A1 | 10/2021 | Prendergast | |

FOREIGN PATENT DOCUMENTS

| | | |
|---|---|---|
| CN | 205963322 U | 2/2017 |
| CN | 106725954 A | 5/2017 |
| CN | 108714061 A | 10/2018 |
| CN | 112869902 A | 6/2021 |
| CN | 215019485 U | 12/2021 |
| WO | 2021169262 A1 | 9/2021 |

* cited by examiner

*Primary Examiner* — Shay Karls
(74) *Attorney, Agent, or Firm* — Andrew C. Cheng

(57) ABSTRACT

Disclosed is an oral caring device. The oral caring device includes a handle part and a caring head part, the handle part is configured to be suitable for hand-holding, the caring head part includes a flushing stem, and a brush head structure, arranged at the second end of the flushing stem. According to the technical solution of the present disclosure, the oral caring device has a synchronous flushing function to improve a cleaning effect and user experience.

10 Claims, 7 Drawing Sheets

ORAL CARING DEVICE

CROSS-REFERENCE TO RELATED APPLICATIONS

This application claims the benefit of Chinese Application No. 202210940250.8, filed on Aug. 5, 2022. The entire disclosure of the above application is incorporated herein by reference.

TECHNICAL FIELD

The present disclosure relates to the technical field of oral cleaning devices, in particular to an oral caring device.

BACKGROUND

Oral health is very important for many people. A current oral cleaning mode in the market is generally to rinse an oral cavity with an oral irrigator alone or to brush teeth with an electric toothbrush alone. That is, the current oral irrigator or electric toothbrush is an independent unit, and it is impossible to rinse the oral cavity with a water flow from a brush head at the same time of or after tooth brushing. In this way, in a process of cleaning the oral cavity by a user, the user needs to switch two stems back and forth to provide functions of rinsing and brushing the teeth, which will reduce user experience and reduce a cleaning effect of the oral caring device.

SUMMARY

The main objective of the present disclosure is to provide an oral caring device. The above oral caring device has a synchronous flushing function to improve a cleaning effect and user experience.

In order to achieve the above objective, the present disclosure provides an oral caring device, including a handle part and a caring head part. The handle part is configured to be suitable for hand-holding, and the handle part includes: a sonic motor, including a motor body and a power output shaft. The motor body has an output axis extending in a power output direction; the power output shaft is a columnar body extending along the output axis and penetrating through the motor body, the power output shaft is configured to cooperate with the motor body and transmit output power of the motor body, the power output shaft has an axial channel parallel to the output axis, and a first inlet and a first outlet which both communicate with the axial channel, and the first inlet is used for inflow of a fluid on a fluid incoming side. The caring head part includes a flushing stem, defining an flow channel, and a second inlet and a second outlet which both communicate with the flow channel, wherein the flow channel is parallel to the output axis, the second inlet is formed at a first end of the flushing stem, the second outlet is formed at a second end of the flushing stem, the first end of the flushing stem is connected with the power output shaft, and the second inlet communicates with the first outlet; and a brush head structure, arranged at the second end of the flushing stem, wherein the brush head structure includes a brush head body, a plurality of bristles arranged on the brush head body and a water outlet end arranged on the brush head body, the bristles extend in a direction that form a preset included angle with the output axis, and the water outlet end communicates with the second outlet, so that the fluid flows through the axial channel and the flow channel in sequence and then is sprayed out from the water outlet end.

Further, the brush head body is provided with an installation through hole that forms an included angle with the output axis, the brush head structure further includes a nozzle having an axial through hole, one end of the nozzle communicates with the second outlet, the other end of the nozzle protrudes out of the installation through hole and forms the water outlet end, and the nozzle is installed on the brush head body in a sealed mode; and/or the nozzle is made of an elastic material.

Further, the axial through hole includes a first hole segment and a second hole segment which communicate with each other, an inner diameter of the first hole segment is smaller than an inner diameter of the second hole segment, the second hole segment is adjacent to the second outlet and communicates with the second outlet, and the water outlet end is formed at one end of the first hole segment away from the second hole segment.

Further, along an axis of the axial through hole, at least part of the axial through hole has an inner diameter that gradually decreases along a direction away from the flushing stem, so that the axial through hole has a conical inner surface; and the caring head part further includes a convex part arranged on the flushing stem, the convex part has an inner through hole, the convex part has a conical outer surface, the conical inner surface is in sealed fit with the conical outer surface, and the inner through hole communicates with the second outlet.

Further, the inner diameter of the first hole segment is greater than or equal to 0.5 mm and less than or equal to 0.7 mm.

Further, the brush head structure further includes an anti-falling piece arranged on a periphery of the nozzle, the anti-falling piece is located on one side of the brush head body facing away from the bristles, so as to prevent the nozzle from falling out of the installation through hole, and the anti-falling piece is in sealed fit with the brush head body.

Further, the water outlet end protrudes relative to the brush head body towards one side thereof facing away from the flushing stem, and a distance H1 between an end face of the water outlet end and the brush head body is greater than or equal to 1 mm and less than or equal to 10 mm; and/or, a distance H2 between a top end of the bristles and the brush head body is greater than or equal to 5 mm and less than or equal to 15 mm.

Further, the second end of the flushing stem is provided with a first installation groove and a second installation groove which communicate with each other, and an interconnection position between the first installation groove and the second installation groove has a first step surface; and the brush head body includes a first segment and a second segment which are interconnected, an interconnection position between the first segment and the second segment has a second step surface, the first segment is located in the first installation groove, at least part of the second segment is located in the second installation groove, and the first step surface is in sealed fit with the second step surface.

Further, the oral caring device further includes a bracket structure, wherein the bracket structure is configured to be capable of transmitting a driving force of the power output shaft to the flushing stem, the bracket structure is arranged at the first end of the flushing stem, and the bracket structure can be snap-fitted with the power output shaft, so as to limit axial movement of the power output shaft relative to the flushing stem.

Further, a periphery of the power output shaft is provided with a clamping groove, the clamping groove extends in a circumferential direction of the power output shaft, and the bracket structure includes: a holding bracket, having an inner through hole parallel to the output axis, wherein the power output shaft is inserted into the inner through hole; and a clamping piece, arranged on the holding bracket, wherein the clamping piece includes two clamping arms spaced apart in a radial direction of the power output shaft, and the two clamping arms have a clamping position, in which the two clamping arms are close to each other and are snap-fitted with the clamping groove, and a disengagement position, in which the two clamping arms are away from each other and are disengaged from the clamping groove.

By applying the technical solution of the present disclosure, compared with using an oral irrigator to clean an oral cavity alone or using an electric toothbrush to clean the oral cavity alone, in the present embodiment, by arranging the axial channel in the power output shaft for power transmission, arranging the flow channel in the flushing stem, and arranging the water outlet end on the brush head body, the fluid may flow through the axial channel and the flow channel in sequence and then be sprayed out from the water outlet end. In this way, the fluid sprayed out from the water outlet end may further rinse the oral cavity at the same time of or after tooth brushing, so that the oral caring device can not only have a tooth brushing function of the electric toothbrush, but also have a rinsing function of the oral irrigator, thereby improving user experience and improving a cleaning effect of the oral caring device. Therefore, the oral caring device of the present embodiment has a synchronous flushing function.

BRIEF DESCRIPTION OF THE DRAWINGS

The specification drawings constituting a part of the present application are configured to provide further understanding to the present disclosure. Schematic embodiments of the present disclosure and their illustration are configured to explain the present disclosure, and do not constitute improper limitation to the present disclosure. In the accompanying drawings.

Figure 1:
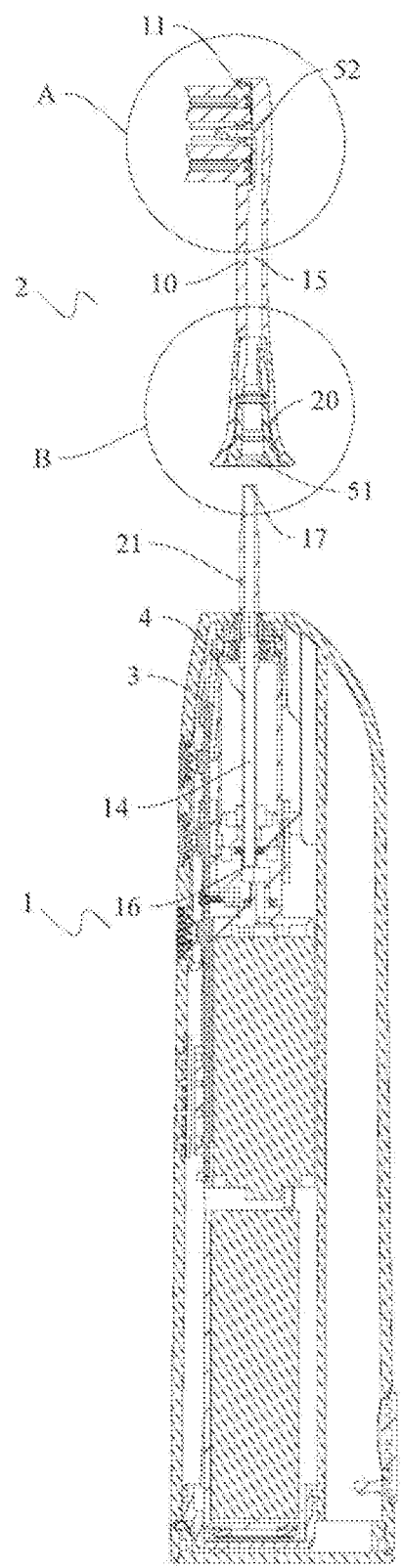
FIG. 1 shows a schematic structural diagram of an oral caring device in accordance with an embodiment of the present disclosure.

Wherein, the above accompanying drawings include the following reference numerals:

1. Handle part; 2. Caring head part; 3. Motor body; 4. Power output shaft; 10. Flushing stem; 11. Brush head structure; 12. Bristles; 13. Water outlet end; 14. Axial channel; 15. Flow channel; 16. First inlet; 17. First outlet; 20. Bracket structure; 21. Clamping groove; 22. Holding bracket; 23. Clamping piece; 231. Clamping arm; 232. Elastic arm; 233. Positioning arm; 24. Installation through groove; 25. Stop bar; 26. Positioning bar; 51. Second inlet; 52. Second outlet; 53. Installation through hole; 54. Nozzle; 55. First hole segment; 56. Second hole segment; 57. Convex part; 58. Anti-falling piece; 59. First installation groove; 60. Second installation groove; 61. First segment; and 62. Second segment.

DETAILED DESCRIPTION

It should be noted that embodiments in the present application and features in the embodiments may be mutually combined in the case of no conflict. The present disclosure will be illustrated below in detail with reference to the accompanying drawings and in combination with the embodiments.

As shown in FIG. 1, an embodiment of the present disclosure provides an oral caring device. The oral caring device includes a handle part 1 and a caring head part 2. The handle part 1 is configured to be suitable for hand-holding, and the handle part 1 includes a sonic motor. The sonic motor includes a motor body 3 and a power output shaft 4, and the motor body 3 has an output axis extending in a power output direction; the power output shaft 4 is a columnar body extending along the output axis and penetrating through the motor body 3, the power output shaft 4 is configured to cooperate with the motor body 3 and transmit output power of the motor body 3, the power output shaft 4 has an axial channel 14 parallel to the output axis, and a first inlet 16 and a first outlet 17 which both communicate with the axial channel 14, and the first inlet 16 is used for inflow of a fluid on a fluid incoming side; and the caring head part 2 includes a flushing stem 10 and a brush head structure 11. The flushing stem 10 defines a flow channel 15, and a second inlet 51 and a second outlet 52 which both communicate with the flow channel 15, the flow channel 15 is parallel to the output axis, the second inlet 51 is formed at a first end of the flushing stem 10, the second outlet 52 is formed at a second end of the flushing stem 10, the first end is connected with the power output shaft 4, and the second inlet 51 communicates with the first outlet 17. The brush head structure 11 is arranged at the second end of the flushing stem 10, the brush head structure 11 includes a brush head body, a plurality of bristles 12 arranged on the brush head body and a water outlet end 13 arranged on the brush head body, the bristles 12 extend in a direction that forms a preset included angle with the output axis, and the water outlet end 13 communicates with the second outlet 52, so that the fluid flows through an axial channel 14 and the flow channel 15 in sequence and then is sprayed out from the water outlet end 13.

In the above technical solution, compared with using an oral irrigator to clean an oral cavity alone or using an electric toothbrush to clean the oral cavity alone, in the present embodiment, by arranging the axial channel 14 in the power output shaft 4 for power transmission, arranging the flow channel 15 in the flushing stem 10, and arranging the water outlet end 13 on the brush head body, the fluid may flow through the axial channel 14 and the flow channel 15 in sequence and then be sprayed out from the water outlet end 13. In this way, the fluid sprayed out from the water outlet end 13 may further rinse the oral cavity at the same time of or after tooth brushing, so that the oral caring device can not only have a tooth brushing function of the electric toothbrush, but also have a rinsing function of the oral irrigator, thereby improving user experience and improving a cleaning effect of the oral caring device. Therefore, the oral caring device of the present embodiment has a synchronous flushing function.

Further, in the present embodiment, by making the power output shaft 4 have the axial channel 14 parallel to the output axis, and the first inlet 16 and the first outlet 17 communicating with the axial channel 14, when the fluid on the fluid incoming side reaches a position of the sonic motor, it is not necessary to run a pipe outside the sonic motor, and it can be directly connected with the power output shaft 4 of the sonic motor, so that the axial channel 14 of the power output shaft 4 can be utilized for fluid transportation, and thus the fluid can flow through the interior of the power output shaft 4 inside the sonic motor without making other changes in a product structure (that is, avoiding additionally arranging a transmission pipeline to transport the fluid) and without occupying an additional space, and the structure of the sonic motor can be utilized more fully and reasonably, thereby making structural layout of a rinsing flow path more reasonable, reducing a fluid pipeline, saving space occupation, and making an overall size of the oral caring device smaller, a weight lighter, and the stem part more convenient to hold.

It should be noted that the axial channel 14 of the present application can not only convey a water flow, but also convey toothpaste or rinsing fluid.

Figure 2:
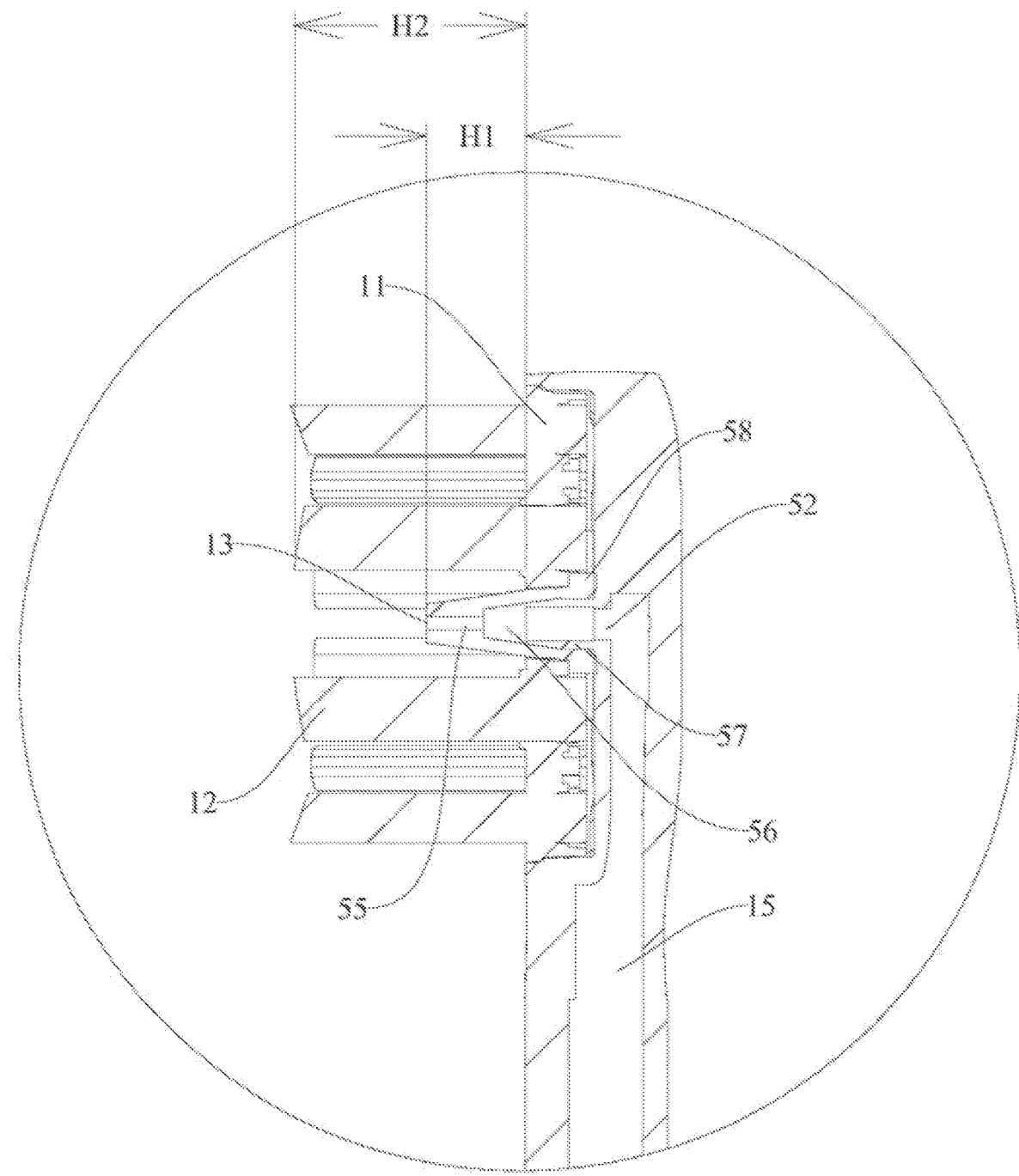
FIG. 2 shows a partial enlarged view at A of an oral caring device of FIG. 1.
Figure 3:
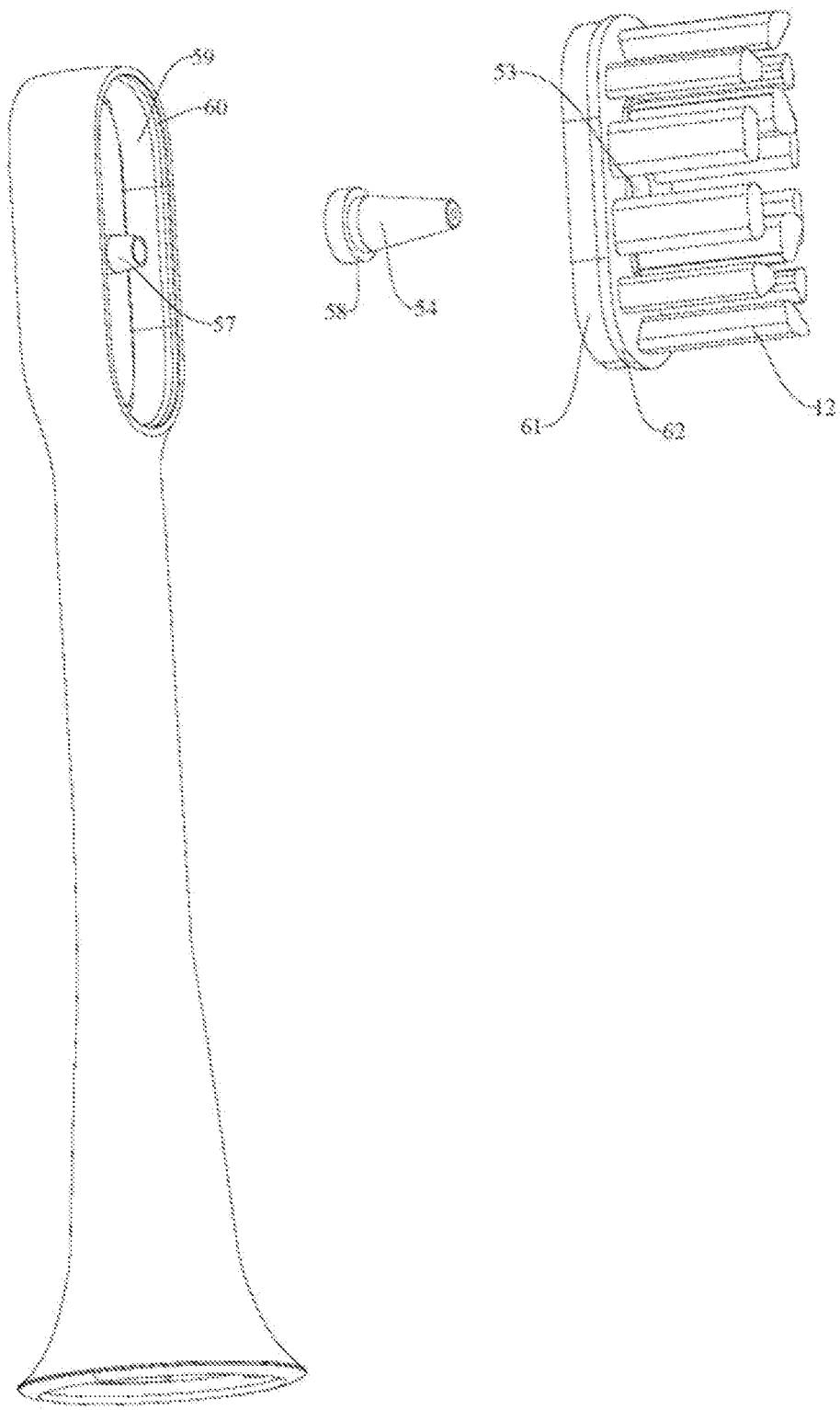
FIG. 3 shows a schematic breakdown structural diagram of a caring head part of an oral caring device of FIG. 1.

As shown in FIG. 2 and FIG. 3, in the embodiment of the present disclosure, the brush head body is provided with an installation through hole 53 that forms an included angle with the output axis, the brush head further includes a nozzle 54 having an axial through hole, one end of the nozzle 54 communicates with the second outlet 52, the other end of the nozzle 54 protrudes out of the installation through hole 53 and forms the water outlet end 13, and the nozzle 54 is installed on the brush head body in a sealed mode.

In the above technical solution, compared with directly making the fluid flow out of the installation through hole 53, in the present embodiment, the water flowing out of the second outlet 52 may be sprayed out from the nozzle 54 by arranging the nozzle 54 penetrating out of the installation through hole 53. In this way, a distance between the water outlet end 13 and teeth can be reduced, so that the water outlet end 13 is closer to the teeth to flush the teeth better, so as to improve the cleaning effect of the oral caring device. It should be noted that the central axis of the nozzle 54 may be perpendicular to the brush head body, or may have an included angle of an acute angle of less than 90° with the brush head body.

Preferably, in the embodiment of the present disclosure, the nozzle 54 is made of an elastic material, preferably rubber. In this way, on the one hand, when brushing the teeth, if the nozzle 54 makes contact with the teeth due to a strong force of a user, a problem of poor experience caused by the nozzle 54 hitting the teeth can be avoided. On the other hand, the nozzle 54 is used to be installed on a toothbrush, which has a delicate structure and is made of the elastic material for easy machining, so as to avoid a problem of cracks when machining the axial through hole. In addition, some technologies use additional copper installation pieces to assemble the nozzle 54. After a period of use, the copper installation pieces are prone to producing copper rust, which will affect oral health, and cause poor user experience. In the embodiment of the present application, the nozzle 54 made of the rubber is directly installed in the installation through hole 53 without additionally arranging the copper installation pieces, thereby improving the use experience of the user.

As known to the inventor, the brush head structure generally adopts copper bristle-planting, which is prone to producing the copper rust after tooth brushing, especially after rinsing, and affects the oral health. Therefore, a bristle planting process of the brush head structure 11 in the present embodiment adopts a copper-free bristle planting process.

As shown in FIG. 2, in the embodiment of the present application, the axial through hole includes a first hole segment 55 and a second hole segment 56 which communicate with each other, an inner diameter of the first hole segment 55 is smaller than an inner diameter of the second hole segment 56, the second hole segment 56 is adjacent to the second outlet 52 and communicates with the second outlet 52, and the water outlet end 13 is formed at one end of the first hole segment 55 away from the second hole segment 56.

Through the above arrangement, after flowing out of the second outlet 52, the fluid may be sprayed out from the second hole segment 56 and the first hole segment 55 in sequence. Since the inner diameter of the first hole segment 55 is smaller than the inner diameter of the second hole segment 56, when the flow quantity is constant, a flow rate of the fluid in the first hole segment 55 is greater than a flow rate in the second hole segment 56. In this way, a spraying-out speed of the fluid may be increased, thus increasing the cleaning effect of the fluid on the teeth.

As shown in FIG. 2, in the embodiment of the present disclosure, along an axis of the axial through hole, at least part of the axial through hole has an inner diameter that gradually decreases along a direction away from the flushing stem 10, so that the axial through hole has a conical inner surface; and the caring head part 2 further includes a convex part 57 arranged on the flushing stem 10, the convex part 57 has an inner through hole, the convex part 57 has a conical outer surface, the conical inner surface is in sealed fit with the conical outer surface, and the inner through hole communicates with the second outlet 52.

In the above technical solution, on the one hand, radial seal may be realized by arranging the convex part 57 which is in sealed fit with the axial through hole, so as to prevent the fluid in the second hole segment 56 from flowing out of a position between the nozzle 54 and the brush head body; on the other hand, an effect of axial water blocking may be increased by arranging the conical inner surface and the conical outer surface which are in sealed fit, so as to prevent the fluid in the second hole segment 56 from flowing out of a position between an outer wall surface of the convex part 57 and an inner wall surface of the second hole segment 56, thereby increasing a sealing effect to improve the user experience.

Further, the nozzle 54 made of the elastic material may be expanded on the periphery of the convex part 57 under the elastic force to increase the sealing effect.

Preferably, in the embodiment of the present disclosure, the inner diameter of the second hole segment 56 gradually decreases along the direction away from the flushing stem 10, and the second hole segment 56 has the conical inner surface cooperating with the conical outer surface. Of course, in an alternative embodiment not shown in the accompanying drawings, an inner diameter of the entire axial through hole may also gradually decrease as long as the conical inner surface can be formed.

Preferably, in the embodiment of the present disclosure, the inner diameter of the first hole segment is greater than or equal to 0.5 mm and less than or equal to 0.7 mm. In this way, the speed at which the fluid is sprayed out from the first hole segment 55 may be effectively increased, thereby increasing cleaning force of the fluid on the oral cavity.

As shown in FIG. 2 and FIG. 3, in the embodiment of the present disclosure, the brush head structure further includes an anti-falling piece 58 arranged on a periphery of the nozzle 54, the anti-falling piece 58 is located on one side of the brush head body facing away from the bristles 12, so as to prevent the nozzle 54 from falling out of the installation through hole 53, and the anti-falling piece 58 is in sealed fit with the brush head body.

In the above technical solution, when flowing in the axial through hole of the nozzle 54, the fluid will produce an axial impact force on the nozzle 54. By arranging the anti-falling piece 58 located on one side of the brush head body facing away from the bristles 12, the anti-falling piece 58 may be limited between the brush head body and the flushing stem 10, which can prevent the nozzle 54 from falling out of the installation through hole 53, so as to more stably fix the nozzle 54. Thus, the oral caring device has the functions of rinsing the oral cavity and brushing the teeth at the same time to improve the user experience.

Preferably, the anti-falling piece 58 and the nozzle 54 are of an integrally-formed structure, and the anti-falling piece is also made of the elastic materials such as rubber.

Specifically, in the embodiment of the present disclosure, the brush head body is pressed-fit on the anti-falling piece 58 to achieve the sealed fit between the anti-falling piece 58 and the brush head body. In this way, the sealing effect may be increased to prevent the fluid in the nozzle 54 from flowing out of the position between the nozzle 54 and the brush head body.

As shown in FIG. 2, in the embodiment of the present disclosure, the water outlet end 13 protrudes relative to the brush head body towards one side thereof facing away from the flushing stem 10, and a distance H1 between an end face of the water outlet end 13 and the brush head body is greater than or equal to 1 mm and less than or equal to 10 mm, preferably, H is greater than or equal to 2 mm and less than or equal to 8 mm; and/or, a distance H2 between a top end of the bristles 12 and the brush head body is greater than or equal to 5 mm and less than or equal to 15 mm.

Through the above arrangement, not only can the water outlet end 13 be close enough to the teeth so that the sprayed fluid has the good cleaning effect, but also the probability of the water outlet end 13 in contact with the teeth can be reduced in the process of tooth brushing, so that discomfort caused by the water outlet end 13 in contact with and rubbing with the teeth can be reduced, thereby improving the user experience.

Specifically, in the embodiment of the present disclosure, a ratio of the distance H1 to the distance H2 is greater than or equal to 0.25 and less than or equal to 0.5. In this way, while ensuring that the fluid has sufficient cleaning power, the probability of contact between the water outlet end 13 and the teeth can further be reduced, thereby improving the user experience.

Figure 4:
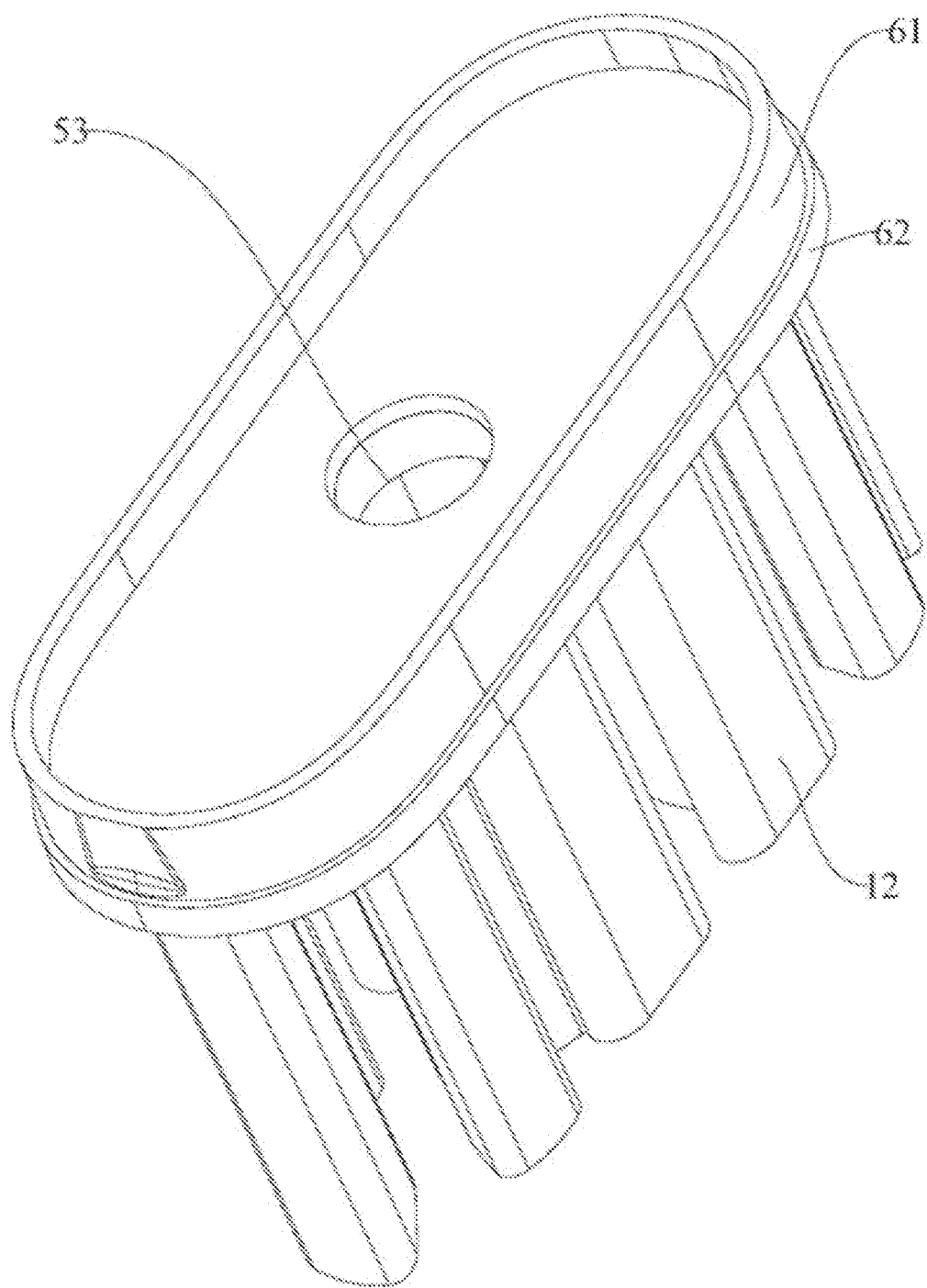
FIG. 4 shows a schematic structural diagram of a brush head structure of a caring head part of FIG. 3.

As shown in FIG. 3 and FIG. 4, in the embodiment of the present disclosure, the second end of the flushing stem 10 is provided with a first installation groove 59 and a second installation groove 60 which communicate with each other, and an interconnection position between the first installation groove 59 and the second installation groove 60 has a first step surface; and the brush head body includes a first segment 61 and a second segment 62 which are interconnected, an interconnection position between the first segment 61 and the second segment 62 has a second step surface, the first segment 61 is located in the first installation groove 59, at least part of the second segment 62 is located in the second installation groove 60, and the first step surface is in sealed fit with the second step surface.

Through the above arrangement, not only can the nozzle 54 be pressed-fit on the flushing stem 10 through the brush head body, but also the sealing between the anti-falling piece 58 and the brush head body, the sealing between the anti-falling piece 58 and the flushing stem 10, and the sealing between the brush head body and the flushing stem 10 can be realized, so as to prevent water from flowing out from the axial through hole of the nozzle 54 via a position between the anti-falling piece 58 and the brush head body, or between the anti-falling piece 58 and the flushing stem 10, or between the brush head body and the flushing stem 10, thereby further avoiding reducing the user experience.

Specifically, in the embodiment of the present disclosure, the brush head body is pressed-fit on the flushing stem 10 in an ultrasonic pressing-fit mode, and the first step surface and the second step surface are ultrasonically bound to increase the sealing effect.

As shown in FIG. 1, in the embodiment of the present disclosure, the oral caring device further includes a bracket structure 20. The bracket structure 20 is configured to be capable of transmitting a driving force of the power output shaft 4 to the flushing stem 10, the bracket structure 20 is arranged at the first end of the flushing stem 10, and the bracket structure 20 can be snap-fitted with the power output shaft 4, so as to limit axial displacement of the power output shaft 4 relative to the flushing stem 10.

In the above technical solution, compared with a problem that the electric toothbrush in the prior art only needs to meet the requirements of vibration transmission or the oral irrigator only needs to consider hydraulic impact, the present embodiment can not only make the bracket structure 20 transmit the driving force of the power output shaft 4 to the flushing stem 10 by arranging the bracket structure 20, so as to ensure that the vibration is transmitted to the flushing stem 10, thus realizing the tooth brushing function of the electric toothbrush. Moreover, the bracket structure 20 is snap-fitted with the power output shaft 4, which can further limit the axial displacement of the power output shaft 4 relative to the flushing stem 10. In this way, a problem that the power output shaft 4 falls out of the flushing stem 10 due to the hydraulic impact can be avoided, so that swinging force transmitted by the power output shaft 4 can be more stably transmitted to the flushing stem 10, thus making the oral caring device in the present embodiment not only have the tooth rushing function of the electric toothbrush, but also have the flushing function of the oral irrigator, thereby improving the user experience and improving the cleaning effect of the oral caring device. Therefore, the oral caring device of the present embodiment has a synchronous flushing function.

It should be noted that in the embodiment of the present disclosure, when the fluid flows from the power output shaft 4 into the flow channel 15 of the flushing stem 10, the high-pressure fluid will produce a water flow impact force on the end of the power output shaft 4, which is prone to causing the power output shaft 4 in FIG. 1 to fall out of the flushing stem 10. However, the present embodiment can solve this problem by arranging the bracket structure 20.

As shown in FIG. 1, FIG. 5, FIG. 6 and FIG. 7, in the embodiment of the present disclosure, a periphery of the power output shaft 4 is provided with a clamping groove 21, the clamping groove 21 extends in a circumferential direction of the power output shaft 4, and the bracket structure 20 includes a holding bracket 22 and a clamping piece 23. The holding bracket 22 have an inner through hole parallel to the output axis, and the power output shaft 4 is inserted into the inner through hole; and the clamping piece 23 is arranged on the holding bracket 22, the clamping piece 23 includes two clamping arms 231 spaced apart in a radial direction of the power output shaft 4, and the two clamping arms 231 have a clamping position, in which the two clamping arms 231 are close to each other and are snap-fitted with the clamping groove, and a disengagement position, in which the two clamping arms 231 are away from each other and are disengaged from the clamping groove 21.

Through the above arrangement, when the power output shaft 4 is inserted into the inner through hole and a position between the two clamping arms 231, the two clamping arms 231 may be away from each other under the action of the power output shaft 4 until the clamping groove 21 of the power output shaft 4 moves to a position corresponding to the clamping arms 231. The two clamping arms 231 will be close to each other and are clamped into the clamping groove 21, so as to limit the axial displacement of the power output shaft 4 relative to the holding bracket 22. In this way, the problem that the power output shaft 4 falls out of the flushing stem 10 due to the hydraulic impact may be avoided, so that the swinging force transmitted by the power output shaft 4 can be more stably transmitted to the flushing stem 10, and thus the oral caring device in the present embodiment not only has the tooth brushing function of the electric toothbrush, but also has the flushing function of flushing the teeth.

Figure 7:
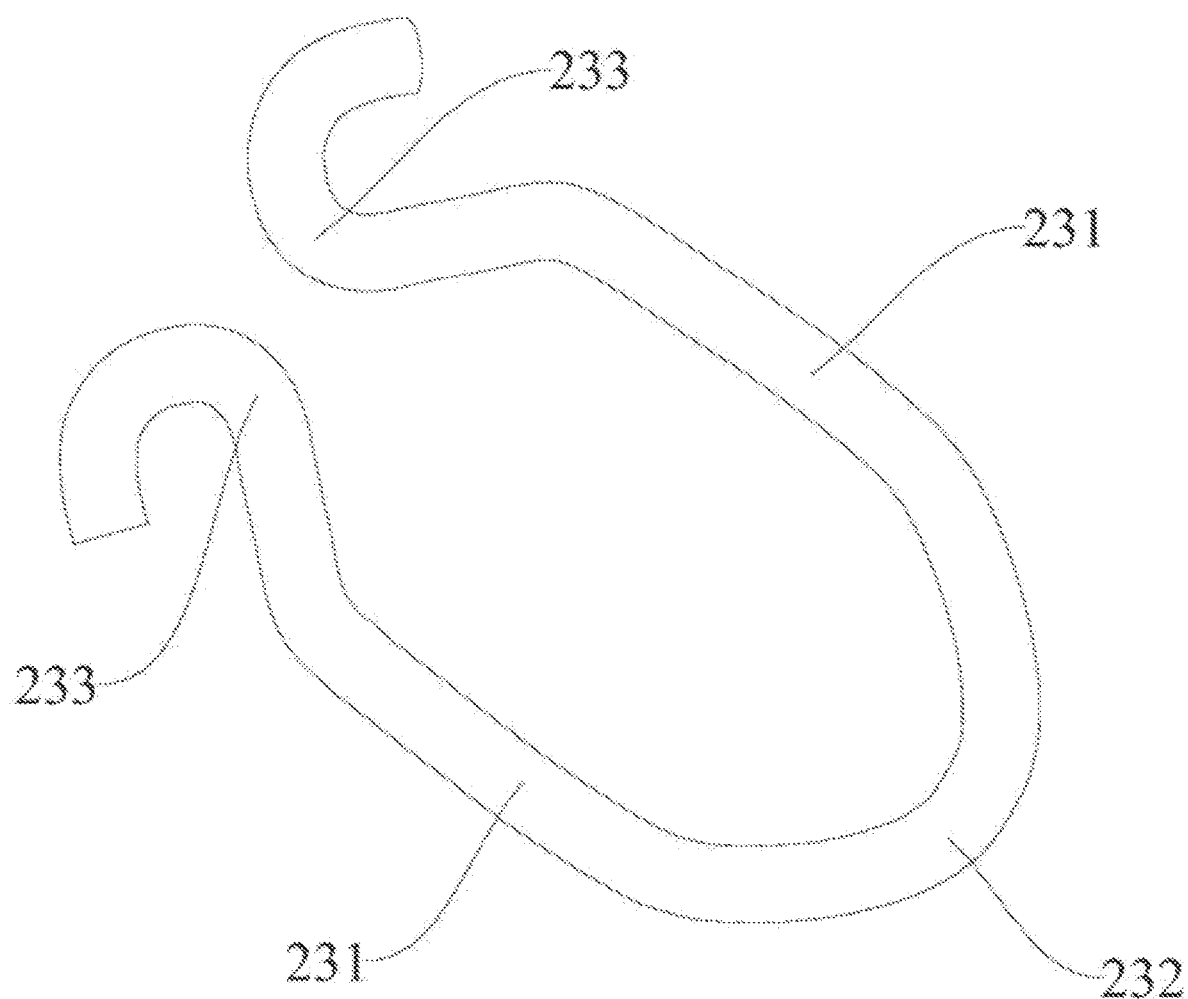
FIG. 7 shows a schematic structural diagram of a clamping piece of a bracket structure of FIG. 6.

As shown in FIG. 7, in the embodiment of the present disclosure, the clamping piece 23 further includes an elastic arm 232 for connecting the two clamping arms 231, so that the two clamping arms 231 are switched from the disengagement position to the clamping position.

Through the above arrangement, when the power output shaft 4 is installed into the inner through hole, under the action of assembly force of the power output shaft 4, the two clamping arms 231 may be opened, the elastic arm 232 deforms until the clamping groove 21 of the power output shaft 4 moves to the position corresponding to the clamping arms 231, and then the elastic arm 232 recovers its deformation to drive the two clamping arms 231 to get close to each other, so as to be clamped into the clamping groove 21, which prevents the axial movement of the power output shaft 4 relative to the holding bracket 22. In this way, the problem that the power output shaft 4 falls out of the flushing stem 10 due to the hydraulic impact may be avoided.

Further, since the elastic arm 232 is elastic, when it is necessary to remove the power output shaft 4 from the flushing stem 10, a user may use a force greater than the impact force of a water flow to pull the power output shaft 4 out of the inner through hole. In this way, the elastic arm 232 will deform to drive the two clamping arms 231 away from each other, so that the clamping arms 231 are disengaged from the clamping groove 21. In this way, when the brush head structure 11 needs to be replaced due to wear after a long time of use, the above structure may realize rapid disassembly, which is convenient for the user to timely replace the caring head part 2.

Preferably, in the embodiment of the present disclosure, an inner wall of the clamping groove 21 is connected with a side wall of the power output shaft 4 through an arc-shaped transition section. In this way, when the power output shaft 4 is installed, the clamping arms 231 may slide more smoothly into the clamping groove 21 from the side wall of the power output shaft 4, and when the power output shaft 4 is disassembled, the clamping arms 231 may slide more smoothly out of the interior of the clamping groove 21.

In an alternative embodiment, only two clamping arms 231 may be arranged, and are made of the elastic material. In this way, under the action of the power output shaft 4, the two clamping arms 231 may be away from each other, and when the clamping groove 21 of the power output shaft 4 moves to the position corresponding to the clamping arms 231, the two clamping arms 231 will recover deformation and get close to each other to be clamped into the clamping groove 21.

Figure 5:
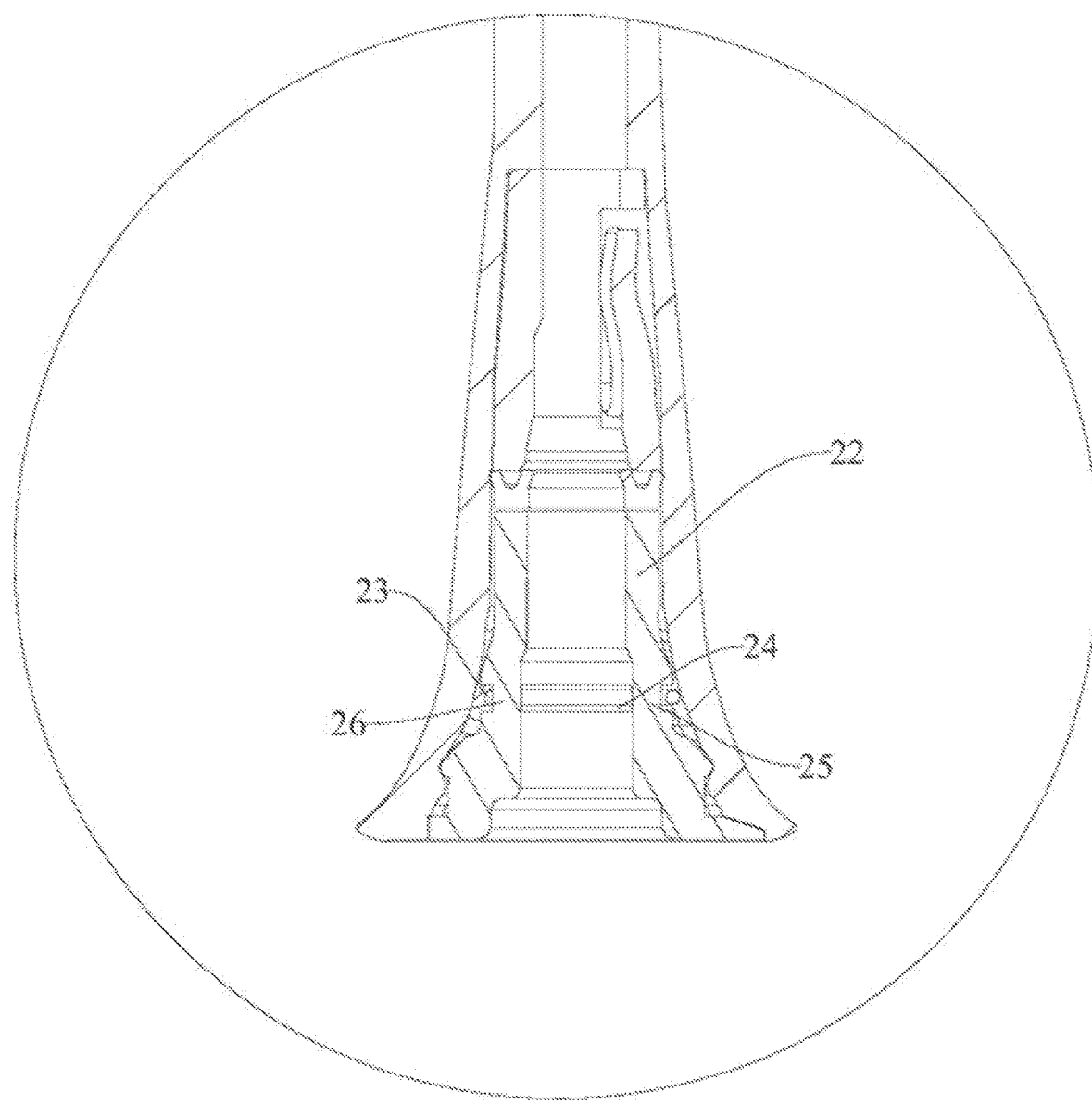
FIG. 5 shows a partial enlarged view at B of an oral caring device of FIG. 1.
Figure 6:
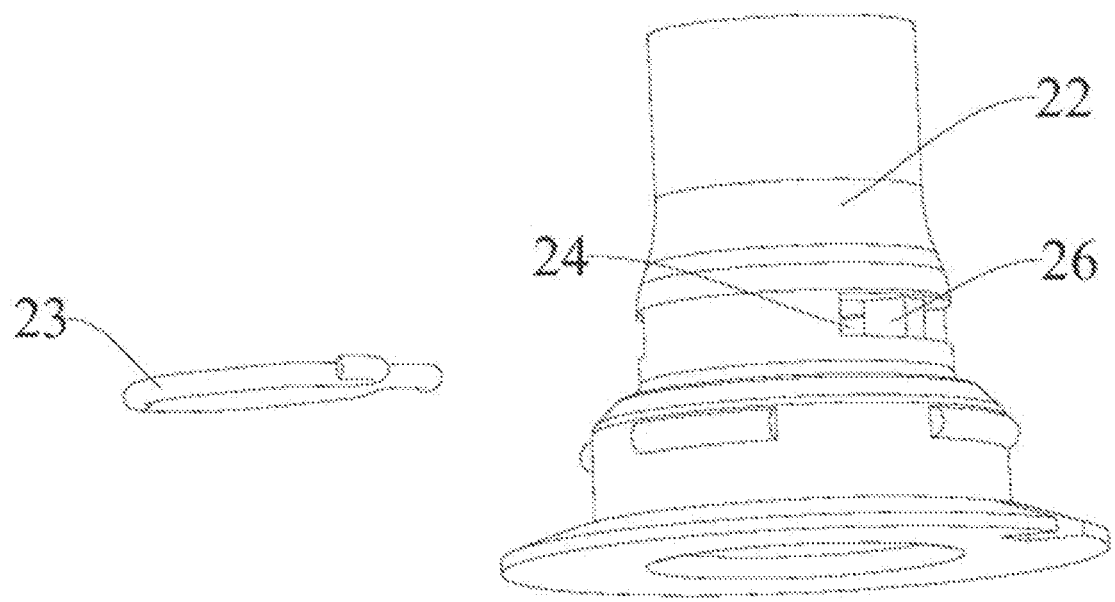
FIG. 6 shows a schematic breakdown structural diagram of a bracket structure of FIG. 5.

As shown in FIG. 1, FIG. 5 and FIG. 6, in the embodiment of the present disclosure, the holding bracket 22 is provided with an installation through groove 24 communicating with the inner through hole. The installation through groove 24 runs through the holding bracket 22 in the radial direction of the power output shaft 4; and a circumferential inner wall of the installation through groove 24 is in clearance fit with the clamping arms 231.

Through the above arrangement, the clamping piece 23 may be installed in the installation through groove 24, and the two clamping arms 231 may be exposed from the inner through hole and clamped with the clamping groove 21. Further, the circumferential inner wall of the installation through groove 24 is in clearance fit with the clamping arms 231, so that the circumferential inner wall of the installation through groove 24 may limit ultimate displacement of the clamping arms 231, so as to avoid the failure of the elastic arm 232 due to large deformation when the two clamping arms 231 are away from each other.

Specifically, in the embodiment of the present disclosure, a width of the installation through groove 24 on a horizontal plane in FIG. 6 is greater than the inner diameter of the inner through hole, so that the circumferential inner wall of the installation through groove 24 may be in clearance fit with the clamping arms 231.

As shown in FIG. 5 and FIG. 7, in the embodiment of the present disclosure, the clamping piece 23 further includes the elastic arm 232 for connecting the two clamping arms 231, the bracket structure 20 further includes a stop bar 25 connected with the holding bracket 22, one end of the installation through groove 24 is provided with the stop bar 25, and part of the elastic arm 232 is located on one side of the stop bar 25 facing away from the inner through hole (that is, located on the outer side of the stop bar 25) to limit the displacement of the elastic arm 232.

In the above technical solution, when the clamping piece 23 is installed in the installation through groove 24, the stop bar 25 may limit the displacement of the elastic arm 232, so as to prevent the elastic arm 232 from being brought into the inner through hole because the power output shaft 4 is inserted into or out of the inner through hole, so as to prevent the elastic arm 232 entering the inner through hole from affecting the disassembly and installation of the power output shaft 4.

As shown in FIG. 5 and FIG. 7, in the embodiment of the present disclosure, the bracket structure 20 further includes a positioning bar 26 arranged at the other end of the installation through groove 24, the clamping piece 23 further includes two positioning arms 233 connected with the two clamping arms 231 respectively, and the two positioning arms 233 are spaced and located on two sides of the positioning bar 26.

Through the above arrangement, on the one hand, the positioning bar 26 may position the two positioning arms 233. In the disassembly and installation process of the power output shaft 4, the positioning bar 26 may make the clamping piece 23 located at the same position of the installation through groove 24, thus preventing the position of the clamping piece 23 from shifting due to the power output shaft 4 penetrating into or out of the inner through hole, so that the power output shaft 4 can be disassembled and installed conveniently and quickly. On the other hand, the positioning bar 26 can open the two positioning arms 233, so that a spacing between the two clamping arms 231 can make the power output shaft 4 inserted therein.

Preferably, in the embodiment of the present embodiment, the stop bar 25 and the positioning bar 26 are symmetrically arranged relative to an axis of the inner through hole of the holding bracket 22. In this way, any one of the positioning bar 26 and the stop bar 25 may limit the displacement of the elastic arm 232 or position the clamping piece 23, which is convenient for machining.

Preferably, in the embodiment of the present disclosure, the clamping piece 23 is a U-shaped clamp spring, which certainly can also be a spring of other forms.

In one embodiment, the oral caring device further includes a fluid mechanism and a battery. The fluid mechanism includes a flow-in inlet that can transport the incoming fluid to the fluid mechanism and a flow-out outlet that can transport the incoming fluid to the first inlet 16. The fluid mechanism includes a power plant that can provide driving force for flowing of the fluid, so that the fluid flows from the flow-in inlet to the flow-out outlet, and the fluid may pass through the fluid mechanism, the axial channel 14 and the flow channel 15 in sequence and then is sprayed out from the water outlet end 13. Preferably, the power plant may be a gear pump or a diaphragm pump, etc.

The battery can provide an energy source for the power plant and the sonic motor. The battery is arranged at one end of the fluid mechanism away from the sonic motor. The sonic motor, the fluid mechanism and the battery are arranged in sequence in a direction parallel to the output axis.

In the present embodiment, under the driving of the power plant of the fluid mechanism, after flowing out of a water storage cavity, the fluid enters the fluid mechanism through the flow-in inlet of the fluid mechanism, flows out of the flow-out outlet of the fluid mechanism, then is transported to the power output shaft 4, enters the axial channel 14 from the first inlet 16 of the axial channel 14 of the power output shaft 4, then flows from the axial channel 14 to the other end of the motor body 3, flows out from the first outlet 17 of the axial channel 14, enters the caring head part 2, and is finally sprayed out from the water outlet end 13 of the caring head part 2 to rinse the oral cavity. In addition, the sonic motor can output power to the caring head part 2 through the power output shaft 4, and transmit it to the brush head structure 11 through the flushing stem 10 of the caring head part 2, so that the brush head structure 11 can brush under the action of the sonic motor, and the oral cavity is cleaned by utilizing the bristles 12 of the brush head structure 11.

It can be seen from the above description that the above embodiments of the present disclosure achieve the following technical effects: compared with using the oral irrigator to clean the oral cavity alone or using the electric toothbrush to clean the oral cavity alone, in the present embodiment, by arranging the axial channel in the power output shaft for power transmission, arranging the flow channel in the flushing stem, and arranging the water outlet end on the brush head body, the fluid may flow through the axial channel and the flow channel in sequence and then be sprayed out from the water outlet end. In this way, the fluid sprayed out from the water outlet end may further rinse the oral cavity at the same time of or after tooth brushing, so that the oral caring device can not only have the tooth brushing function of the electric toothbrush, but also have the rinsing function of the oral irrigator, thereby improving the user experience and improving the cleaning effect of the oral caring device. Therefore, the oral caring device of the present embodiment has the synchronous flushing function.

The above descriptions are only preferred embodiments of the present disclosure, and are not intended to limit the present disclosure. For those skilled in the art, the present disclosure can have various changes and variations. Any modification, equivalent replacement, improvement and the like made within the spirit and scope of the present disclosure shall all be included in the protection scope of the present disclosure.

What is claimed is:

1. An oral caring device, comprising a handle part and a caring head part, wherein the handle part is configured to be suitable for hand-holding, and the handle part comprises:

a sonic motor, comprising a motor body and a power output shaft, wherein the motor body has an output axis extending in a power output direction; the power output shaft is a columnar body extending along the output axis and penetrating through the motor body, the power output shaft is configured to cooperate with the motor body and transmit output power of the motor body, the power output shaft has an axial channel parallel to the output axis, and a first inlet and a first outlet which both communicate with the axial channel, and the first inlet is used for inflow of a fluid on a fluid incoming side; and the caring head part comprises:

a flushing stem, defining a flow channel, and a second inlet and a second outlet which both communicate with the flow channel, wherein the flow channel is parallel to the output axis, the second inlet is formed at a first end of the flushing stem, the second outlet is formed at a second end of the flushing stem, the first end of the flushing stem is connected with the power output shaft, and the second inlet communicates with the first outlet;

a brush head structure, arranged at the second end of the flushing stem, wherein the brush head structure comprises a brush head body, a plurality of bristles arranged on the brush head body and a water outlet end arranged on the brush head body, the bristles extend in a direction that forms a preset included angle with the output axis, and the water outlet end communicates with the second outlet, so that the fluid flows through the axial channel and the flow channel in sequence and then is sprayed out from the water outlet end; and the brush head structure further comprises a nozzle having an axial through hole, along an axis of the axial through hole, at least part of the axial through hole has an inner diameter that gradually decreases along a direction away from the flushing stem, so that the axial through hole has a conical inner surface; the caring head part further comprises a convex part arranged on the flushing stem, the convex part has an inner through hole, the convex part is in sealed fit with the axial through hole, the inner through hole communicates with the second outlet.

2. The oral caring device according to claim 1, wherein the brush head body is provided with an installation through hole that forms an included angle with the output axis, one end of the nozzle communicates with the second outlet, the other end of the nozzle protrudes out of the installation through hole and forms the water outlet end, and the nozzle is installed on the brush head body in a sealed mode; and/or the nozzle is made of an elastic material.

3. The oral caring device according to claim 2, wherein the axial through hole comprises a first hole segment and a second hole segment which communicate with each other, an inner diameter of the first hole segment is smaller than an inner diameter of the second hole segment, the second hole segment is adjacent to the second outlet and communicates with the second outlet, and the water outlet end is formed at one end of the first hole segment away from the second hole segment.

4. The oral caring device according to claim 3, wherein the inner diameter of the first hole segment is greater than or equal to 0.5 mm and less than or equal to 0.7 mm.

5. The oral caring device according to claim 2, wherein, the convex part has a conical outer surface, the conical inner surface is in sealed fit with the conical outer surface.

6. The oral caring device according to claim 2, wherein the brush head structure further comprises an anti-falling piece arranged on a periphery of the nozzle, the anti-falling piece is located on one side of the brush head body facing away from the bristles, so as to prevent the nozzle from falling out of the installation through hole, and the anti-falling piece is in sealed fit with the brush head body.

7. The oral caring device according to claim 1, wherein the water outlet end protrudes relative to the brush head body towards one side thereof facing away from the flushing stem, and a distance H1 between an end face of the water outlet end and the brush head body is greater than or equal to 1 mm and less than or equal to 10 mm, and/or,
a distance H2 between a top end of the bristles and the brush head body is greater than or equal to 5 mm and less than or equal to 15 mm.

8. The oral caring device according to claim 1, wherein the second end of the flushing stem is provided with a first installation groove and a second installation groove which communicate with each other, and an interconnection position between the first installation groove and the second installation groove has a first step surface; and
the brush head body comprises a first segment and a second segment which are interconnected, an interconnection position between the first segment and the second segment has a second step surface, the first segment is located in the first installation groove, at least part of the second segment is located in the second installation groove, and the first step surface is in sealed fit with the second step surface.

9. The oral caring device according to claim 1, further comprising a bracket structure, wherein the bracket structure is configured to be capable of transmitting a driving force of the power output shaft to the flushing stem, the bracket structure is arranged at the first end of the flushing stem, and the bracket structure can be snap-fitted with the power output shaft, so as to limit axial movement of the power output shaft relative to the flushing stem.

10. The oral caring device according to claim 9, wherein a periphery of the power output shaft is provided with a clamping groove, the clamping groove extends in a circumferential direction of the power output shaft, and the bracket structure comprises:
a holding bracket, having an inner through hole parallel to the output axis, wherein the power output shaft is inserted into the inner through hole; and
a clamping piece, arranged on the holding bracket, wherein the clamping piece comprises two clamping arms spaced apart in a radial direction of the power output shaft, and the two clamping arms have a clamping position, in which the two clamping arms are close to each other and are snap-fitted with the clamping groove, and a disengagement position, in which the two clamping arms are away from each other and are disengaged from the clamping groove.

* * * * *